Feb. 6, 1940.   G. A. MORTON   2,189,320
ELECTRO-OPTICAL DEVICE
Filed Dec. 31, 1935    2 Sheets-Sheet 1

Witnesses:
Roderick Malcolm
George L. Jepson

Inventor
George A. Morton
by T. R. Goldsborough
Attorney.

Feb. 6, 1940.　　　　G. A. MORTON　　　　2,189,320
ELECTRO-OPTICAL DEVICE
Filed Dec. 31, 1935　　　　2 Sheets-Sheet 2
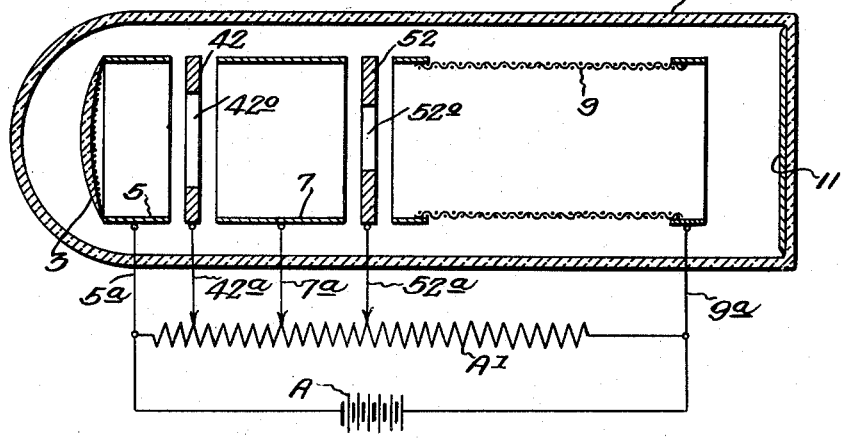

Patented Feb. 6, 1940

2,189,320

UNITED STATES PATENT OFFICE 2,189,320

ELECTRO-OPTICAL DEVICE

George A. Morton, Haddon Heights, N. J., assignor to Radio Corporation of America, a corporation of Delaware Application December 31, 1935, Serial No. 56,850

8 Claims. (Cl. 250—153)

This invention relates to electric discharge devices and particularly to the provision of improvements in electron-lens systems for electrostatically controlled electro-optical devices of the general type disclosed in copending application, Serial No. 52,289 to George A. Morton, filed November 30, 1935.

The above identified application discloses an electron-telescope constituted by a highly evacuated tube containing, adjacent its leading-end, a photo-sensitive cathode adapted to release an entire electron image in response to the impress thereon of a light infra-red or ultra-violet, image of a visible or invisible object. There is a fluorescent, preferably semi-transparent, screen adjacent the opposite end of the tube, against which the electrons constituting the said entire electron-image eventually impinge to form an inverted electron-image corresponding to the light image. Intermediate the cathode and the screen there is a multi-part conduit through which the electrons pass. This conduit comprises a plurality (say, five) of spaced, series-connected, ring-like electrodes each adapted to be maintained at a potential relatively higher, positive or negative, than that of its next preceding member in the cathode direction; an electrode having an aperture of a diameter less than that of the ring-like members, and a relatively long tubular anode or "accelerating" electrode.

The photo-sensitive cathode is preferably of glass or other transparent material coated with platinum and caesiated silver oxide and is curved to correct for curvature of the image field and for so called "pin-cushion" distortion. It is preferably maintained at zero potential with respect to the tubular anode. The spaced group of ring-like members are the focusing electrodes; by uniformly varying the potentials applied thereto the sharpness of the focus may be altered. The orificed member intermediate these rings and the tubular anode is the magnifying electrode; by varying the potential applied thereto the magnification ratio is altered.

The principal object of the present invention is to provide an electro-optical system characterized by an economy of parts and operating potentials.

The above and other objects are accomplished in accordance with the invention by substituting one or more hollow cylindrical electrodes for the group of series-connected ring-like focusing members of the earlier application. In the preferred embodiment of the invention, one of these cylindrical electrodes is physically connected to the photo-sensitive cathode and, unlike the above discussed focusing rings, maintained at the same potential as the cathode. The magnifying electrode may be retained, if desired, in which case it may be positioned either between the cathode cylinder and the "focusing" cylinder or between the latter cylinder and the tubular anode.

While the invention will be disclosed as embodied in a typical electro-optical system, it is not to be limited by such application as the disclosure in this respect is merely illustrative for purposes of explaining the inventive concept.

Figs. 2, 3 and 4 are diagrammatic sectional views of electron-telescopes employing electrode assemblies similar to that of Fig. 1 but including one or more magnification-control electrodes.

Like reference characters designate the same or corresponding parts in all figures.

Figure 1:
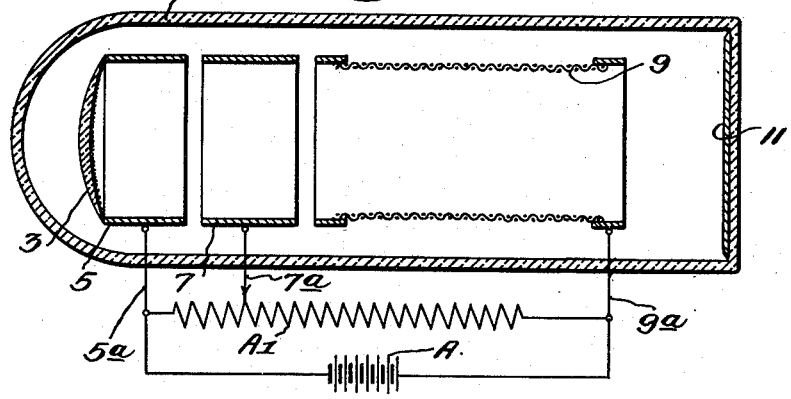
Figure 1 is a diagrammatic, sectional view of an electron-telescope of fixed magnification embodying an electrode assembly within the invention.

In Fig. 1 a lens-system within the invention is shown as applied to an electron-telescope contained in a preferably highly evacuated container 1. A semi-transparent photo-sensitive cathode 3, curved to correct for curvature of the image field and for so-called "pin-cushion" distortion is seated in, or otherwise suitably affixed to the leading end of a hollow cylindrical electron-conduit member 5. Symmetrically arranged in the order shown along the principal axis of the tube 1 is a second short hollow cylindrical conduit member 7 and, spaced therefrom, is a relatively long tubular accelerating or anode electrode 9.

Disposed adjacent to, or, as shown in the drawing, forming part of the opposite end of the tube 1 is a semi-transparent fluorescent screen 11 of willemite or other suitable material upon which electrons from cathode 3 eventually impinge to form an externally visible re-inverted electron image corresponding to the light image.

With the hollow conduit members properly portioned a sharp image of unity or other desired magnification may be achieved in accordance with the general formula $$m \cong \frac{v}{2u}$$

where $m$ is magnification, $v$ is the distance from the electron-center of the lens to the target, and $u$ is the distance from this locus to the electron-source.

In the device of Fig. 1 the "electron-center" of the device, i. e., the region or point where the electrons from the cathode 3 cross the axis of symmetry of the conduit to eventually form a reinverted electron-image upon screen 9, is near to the space intermediate the anode 9 and the central short cylinder 7.

The tube 1 of Fig. 1 is provided with three external leads 5a, 7a and 9a. These leads are connected to a suitable source of current exemplified in the drawing by the battery A and by the potential divider $A_1$. The cathode 3 and the short cylinder 5 integral therewith are connected to the negative terminal and the anode 9 to the positive terminal of the direct current source by leads 5a and 9a, respectively. Focusing is achieved by adjusting the variable tap 7a to the central focusing electrode 7. This alters the intensity and the distribution of the equi-potential electrostatic lines adjacent the space between these cylindrical electrodes and provides a compound or "thick" electron-lens having electrical surfaces of different radii of curvature. During normal operation, the potential difference between the focusing electrode 7 and the anode 9 is substantially greater than that existing between the cathode cylinder 5 and this focusing electrode 7.

Figure 2:
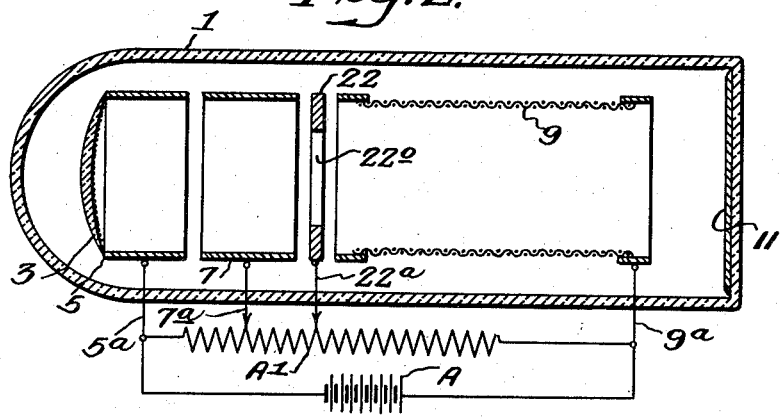

The device of Fig. 2 is provided with a disc-like "magnifying" electrode 22, having an orifice 22° of a diameter less than that of the other conduit members. Magnification is determined by the potential applied to the focusing electrode 7 and the potential applied to electrode 22. The preferred manner of operating the device of Fig. 2 is to set lead 22a at the potential giving the desired magnification and adjusting 7a until the image is sharp. Magnification is increased by making the magnifying electrode 22 electrically more positive and decreased by making it less positive with respect to the voltage applied to the focusing electrode 7. Adjusting the potentials applied to both electrodes serves to alter the contour and distribution of the lines of force constituting the electrostatic field and to move the crossing-point or electron-center of the lens system along the axis of symmetry within the tubular anode 9.

Figure 3:
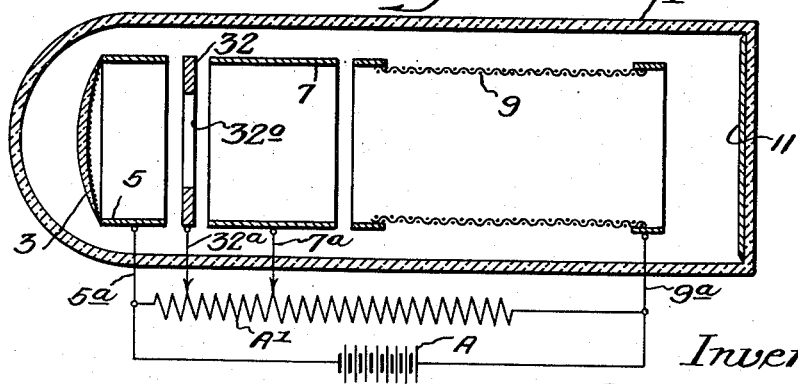

The device of Fig. 3 is similar in all respects with that of Fig. 2 with the exception that the magnifying electrode, here designated 32, is positioned intermediate the cathode cylinder 5 and the other focusing cylinder 7. The electron-center of this lens system may be said to reside normally within the space circumscribed by the focusing electrode 7.

In the device of Fig. 4, two magnifying electrodes 42, and 52 are provided. They are positioned, respectively, between the cathode cylinder 5 and the central focusing cylinder 7, and between cylinder 7 and the anode 9. Here as in the device of Fig. 3, the electron-center of the lens system is within the central cylinder 7, its exact position being determined by the relative potential distribution required to achieve a sharp image of a desired ratio of magnification. The orifice 52° in the electrode 52 which directs the expanding electron beam is not necessarily, but may be, as shown, of a diameter smaller than that of the orifice 42° in the electrode 42 which directs the contracting beam.

As a number of possible embodiments may be made of the above invention, and as changes may be made in the embodiments described without departing from the spirit and scope of the invention, it is to be understood that the foregoing is to be interpreted as illustrative and not in a limiting sense except as required by the prior art and by the appended claims.

What is claimed is:

1. In an electro-optical system, a photo-sensitive cathode adapted to release an entire electron image in response to the impression thereon of a light image, a screen, electrostatic means including an elongated tubular member affixed to said cathode for so directing the electrons constituting the said entire electron image that their paths will cross at a point intermediate said cathode and screen to form an inverted electron-image on said screen corresponding to said light image, said means requiring the application of but a single potential on the cathode side of said electron crossing point.

2. The invention as set forth in claim 1 wherein said electrostatic focusing means includes two elongated tubular members on the cathode side of said electron crossing point, said cathode closing an end of one of said members.

3. In an electro-optical system, a photo-sensitive cathode adapted to release an entire electron image in response to the impression of a light image, an anode, a screen, electrostatic means for so directing the electrons constituting the said entire electron image that their paths will cross at a point intermediate said cathode and anode to form an inverted electron-image on said screen corresponding to said light image, said means including two separately elongated tubular members extending one toward the cathode and the other toward the anode with respect to said electron crossing point.

4. The invention as set forth in claim 3 wherein said electron crossing point falls within the area circumscribed by that tubular member which extends towards the anode.

5. In an electro-optical system, a photo-sensitive cathode adapted to release an entire electron image in response to the impression of a light image thereon, a screen, a conduit intermediate said cathode and screen through which the electrons constituting the said entire electron image pass to form an inverted electron image on said screen corresponding to said light image, said conduit comprising a first tubular member in which said cathode is seated, a second tubular member for electrostatically directing said electrons in a converging beam to a common point and a third tubular member for directing said electrons in an expanding beam from said point to said screen.

6. In an electro-optical system, a photo-sensitive cathode adapted to release an entire electron image in response to the impression of a light image thereon, a screen, a conduit intermediate said cathode and screen through which the electrons constituting the said entire electron image pass to form an inverted electron image on said screen corresponding to said light image, said conduit comprising a first tubular member in which said cathode is seated, a second tubular member for electrostatically directing said electrons in a converging beam to a common point and a third tubular member for directing said electrons in an expanding beam from said point to said screen and means intermediate said second and third tubular members for electrically shifting the point of convergence of said electrons whereby the magnification of said electron-image is altered.

7. In an electro-optical system, a photo-sensitive cathode adapted to release an entire electron image in response to the impression of a light image thereon, a screen, a conduit intermediate said cathode and screen through which the electrons constituting the said entire electron image pass to form an inverted electron image on said screen corresponding to said light image, said conduit comprising a first tubular member in which said cathode is seated, a second tubular member for electrostatically directing said electrons in a converging beam to a common point and a third tubular member for directing said electrons in an expanding beam from said point to said screen, and means intermediate said first and second tubular members for electrically shifting the point of convergence of said electrons whereby the magnification of said electron-image is altered.

8. In an electron-optical system, a photo-sensitive cathode adapted to release an entire electron image in response to the impression of a light image thereon, a screen, a conduit intermediate said cathode and screen through which the electrons constituting the said entire electron image pass to form an inverted electron image on said screen corresponding to said light image, said conduit comprising a first tubular member in which said cathode is seated, a second tubular member for electrostatically directing said electrons in a converging beam to a common point and a third tubular member for directing said electrons in an expanding beam from said point to said screen, and means comprising a disc-like apertured electrode intermediate said first and second tubular members and a second disc-like apertured electrode intermediate said second and third tubular members for electrically shifting the point of convergence of said electrons whereby the magnification of said electron image is altered.

GEORGE A. MORTON.